United States Patent
Naville

(10) Patent No.: US 6,262,941 B1
(45) Date of Patent: Jul. 17, 2001

(54) METHOD AND DEVICE FOR SEISMIC PROSPECTING USING A DRILLING TOOL ACTING IN A WELL

(75) Inventor: Charles Naville, Vlaminck (FR)

(73) Assignee: Institute Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 08/751,163

(22) Filed: Nov. 15, 1996

(30) Foreign Application Priority Data

Nov. 20, 1995 (FR) .................................................. 95 13830

(51) Int. Cl.[7] .................................................. G01V 1/40
(52) U.S. Cl. ................ 367/82; 367/81; 367/83; 181/102; 181/106; 340/853.3; 340/854.4; 175/40; 702/6
(58) Field of Search ........................ 367/81–83; 181/102, 181/106; 340/853.3, 854.4; 175/40, 50

(56) References Cited

U.S. PATENT DOCUMENTS

| 3,190,388 | | 6/1965 | Moser et al. . | |
|---|---|---|---|---|
| 4,066,995 | * | 1/1978 | Matthews | 367/82 |
| 4,829,489 | | 5/1989 | Rector . | |
| 4,965,774 | | 10/1990 | Ng et al. . | |
| 5,128,901 | * | 7/1992 | Drumheller | 367/82 |
| 5,477,505 | * | 12/1995 | Drumheller | 367/82 |
| 5,592,438 | * | 1/1997 | Rorder et al. | 367/83 |

FOREIGN PATENT DOCUMENTS

| 2266372 | 10/1993 | (GB) . |
|---|---|---|
| 2273984 | 7/1994 | (GB) . |

OTHER PUBLICATIONS

Drumheller, D.S; J. Acoust. Soc. Am., vol. 85, #3, 3/89, pp. 1048–1064.*

* cited by examiner

Primary Examiner—Nelson Moskowitz
(74) Attorney, Agent, or Firm—Antonelli, Terry, Stout & Kraus, LLP

(57) ABSTRACT

This invention is a method of conducting seismic prospecting operations using a drilling tool (1) acting at the bottom of a well (2), which creates very powerful seismic vibrations, transmitting reference signals representing the vibrations of the tool in real time or later, and correlating the seismic signals picked up by a receiving assembly (12) with the reference signals. The reference signals are furnished by sensors (7) in contact with the drill string and at a distance from the down-hole assembly constituted by tool (1) and associated drill collars (4). In order for these reference signals to be truly representative, a damping means (8, 19) and at least one filtering element (20) designed to attenuate to a great degree the multiple reflections in a frequency range useful for seismic prospecting are interposed into the drill string. The invention has application to the making of seismic recordings.

9 Claims, 5 Drawing Sheets

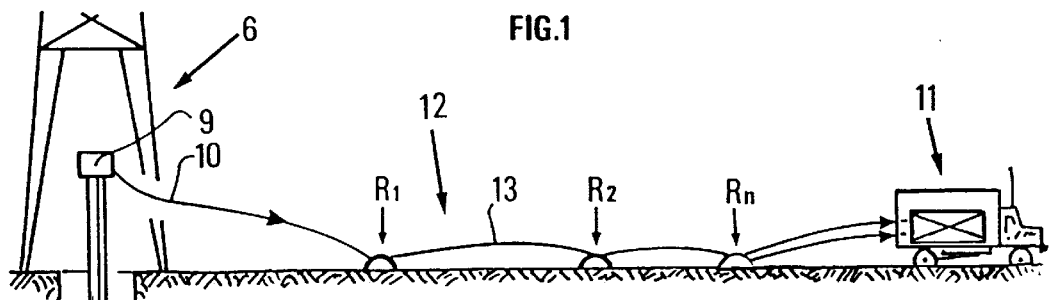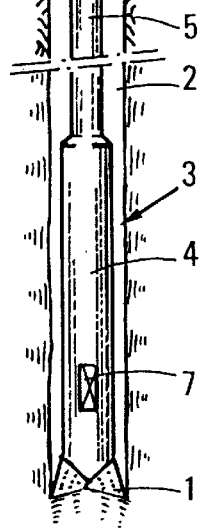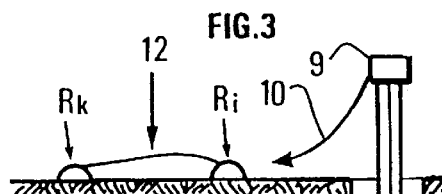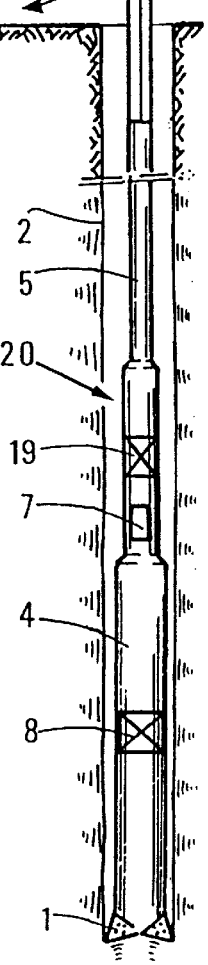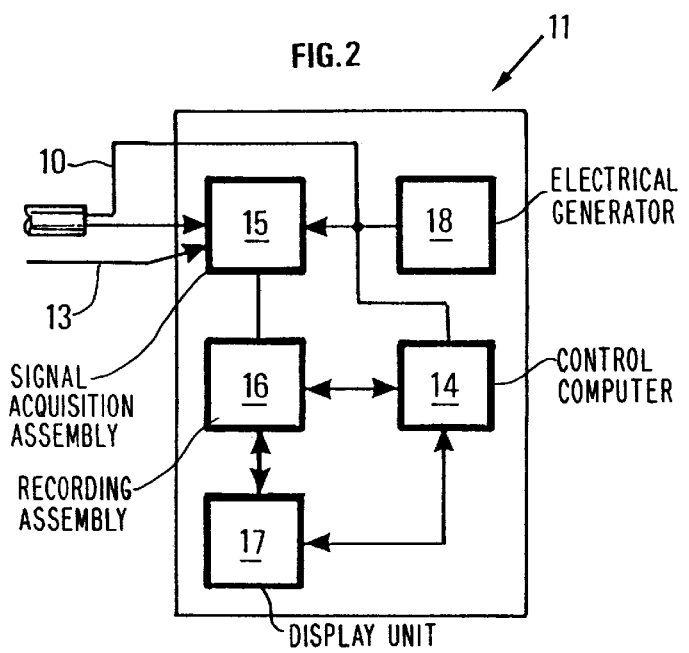

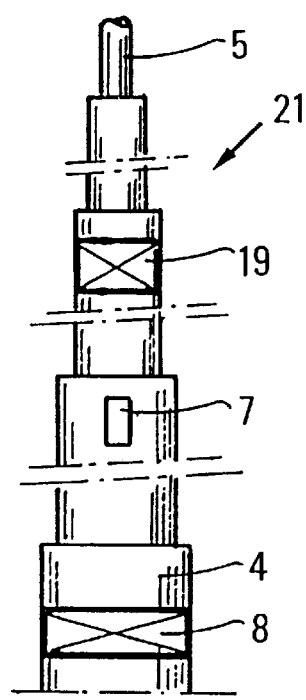
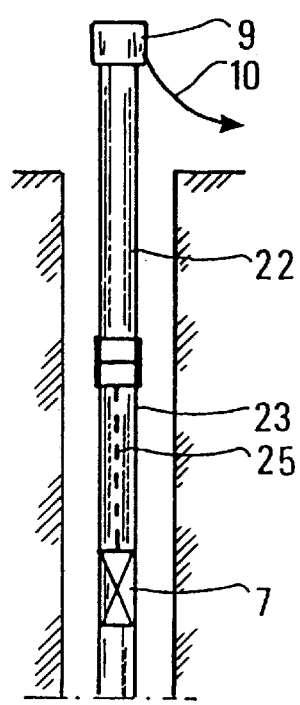
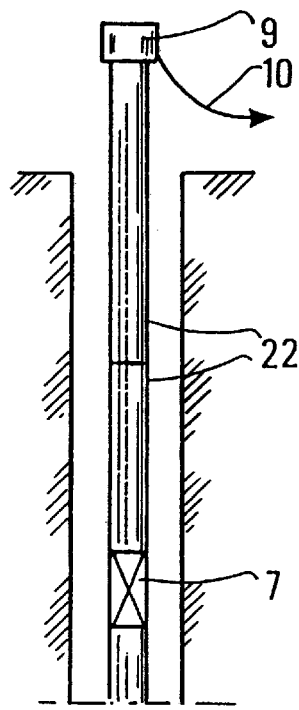

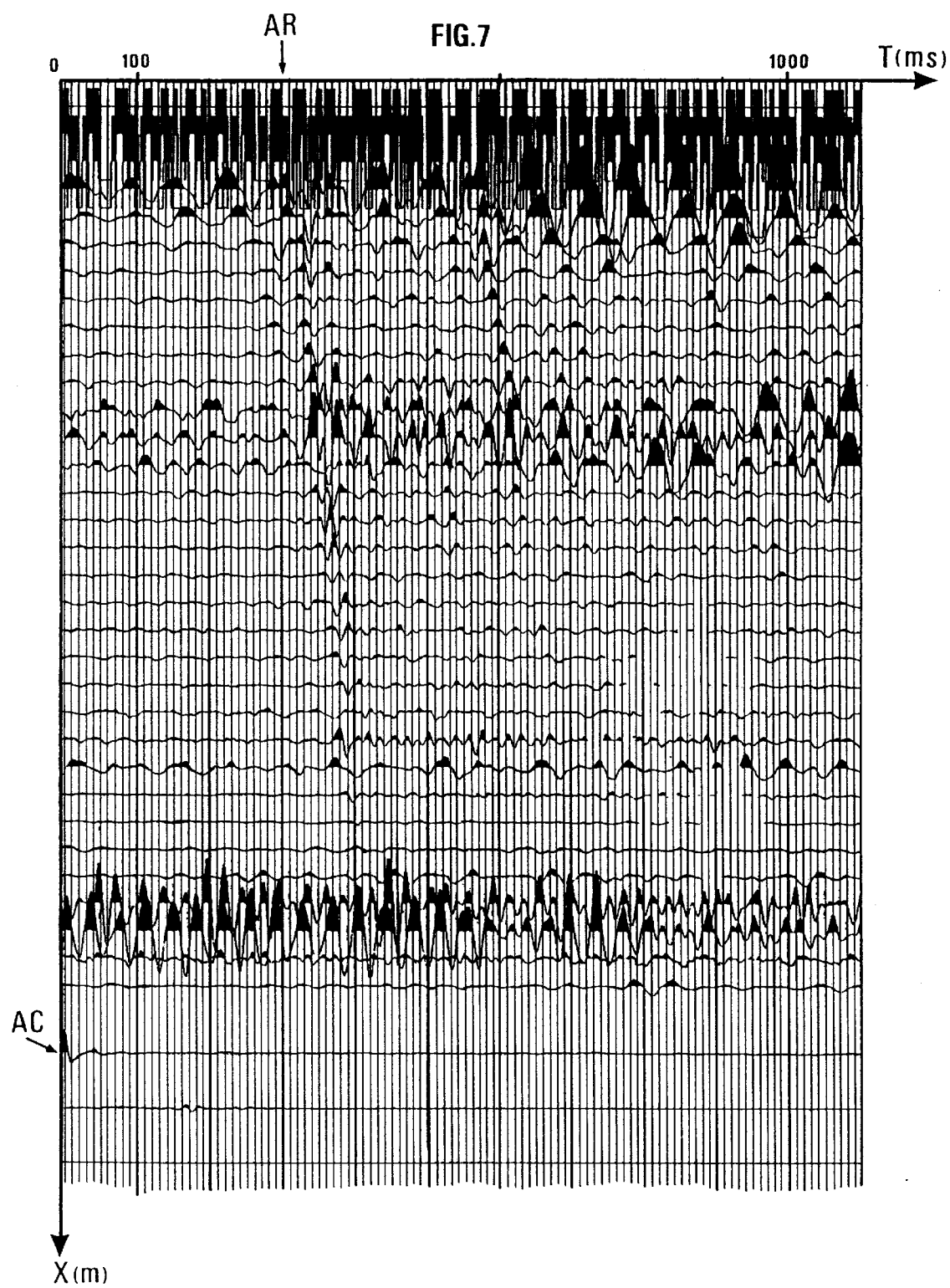

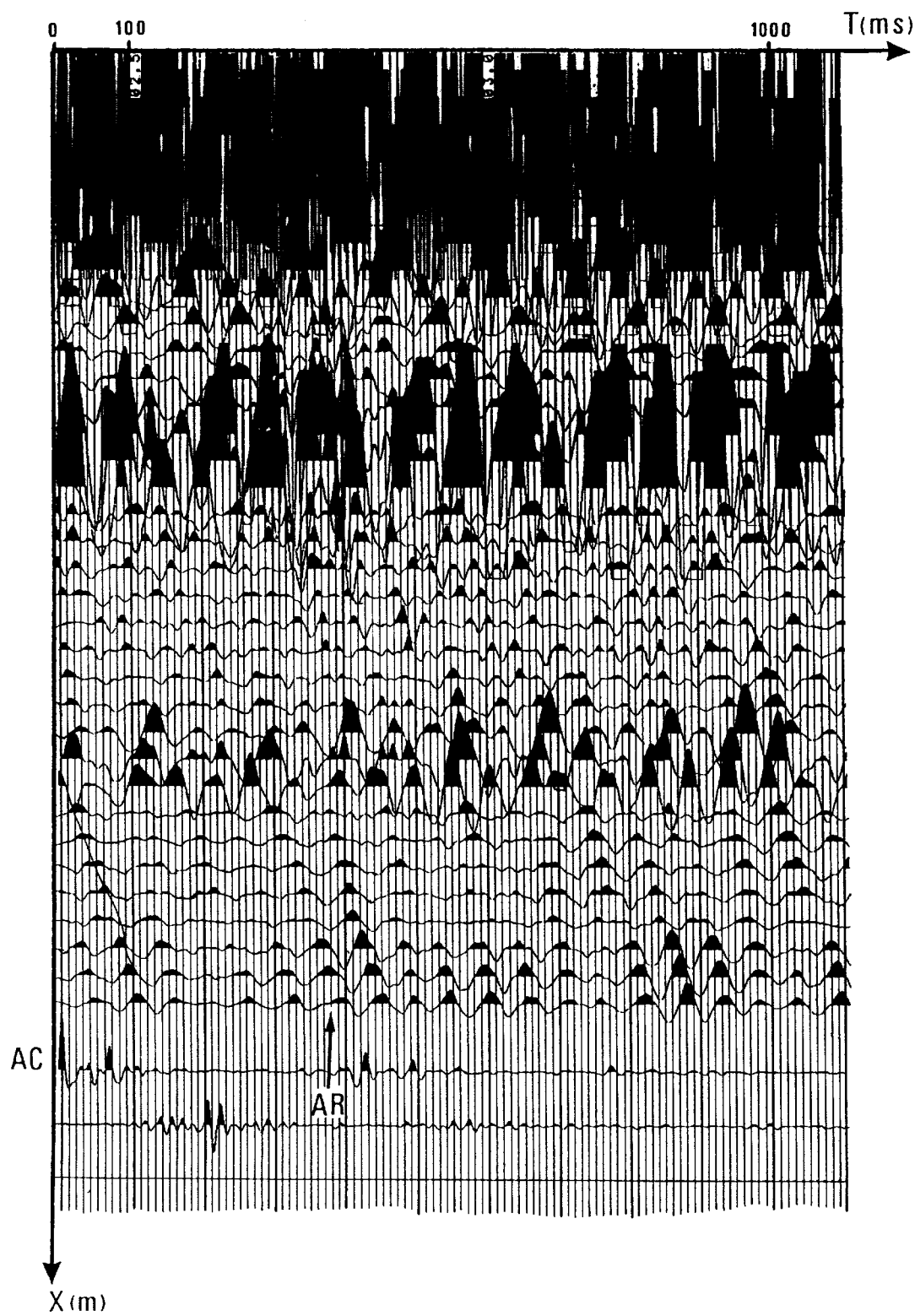

METHOD AND DEVICE FOR SEISMIC PROSPECTING USING A DRILLING TOOL ACTING IN A WELL

BACKGROUND OF THE INVENTION

1. Field of the Invention

The present invention relates to a method and a device for seismic prospecting using a source of seismic vibrations at the bottom of a well.

2. Description of the Prior Art

According to one technique in common use, a well is drilled by a powered drive table at the surface driving a drill string composed of a set of interconnected pipes will a drilling tool attached at its lower end.

Drilling tools of this type produce powerful seismic waves, and the idea of using these waves to measure the rock traversed by the tool during drilling, particularly in seismic prospecting (these operations are known as MWD), with a view to decreasing oil prospecting costs has already been conceived, since the wells are not out of action while measuring is being conducted.

Various embodiments in this field are described in French Patent 1,584,915 and U.S. Pat. Nos. 4,965,774, 4,964,087, 4,926,391, 4,718,048, 4,862,423, 4,675,852, etc.

However, this type of operation is difficult to implement for numerous reasons. One of them is that the characteristic of the signals emitted and the emission spectrum of the source are generally poorly known because of the great distance between the emission location and the surface station. Another is that the vibrations are usually picked up by accelerometers placed in contact with the tubular drill string at the head thereof, after being propagated mechanically over its entire length. Under these conditions, the transmitted signals are strongly altered by complex resonance and absorption phenomena along the string and depend on the structure of the surface installation. Since the transfer function of the entire assembly is poorly known, there is no strict reference for processing the seismic signals.

A signal truly representative of the vibrations emitted by the tool can be obtained if the accelerometer is attached to the bottom of the drill string provided it is possible to transmit the measurements to the surface at a sufficient rate. It is possible to do this using modulated waves such that the sound waves propagate in the fluid contained in the well provided the data transmission rate remains relatively slow.

For applications where the data transmission rate is high, as is the case in prospecting operations, very large down-hole data storage devices can be used, but they must be brought up to the surface regularly by withdrawing the drill string or pulling up the cable in order to dump their contents.

Another technique available for high-speed transmission of signals picked up by one or more down-hole accelerometers is described for example in the Assignee's French 2,688,026 and 2,700,018. It consists essentially of using a drill string of which at least a part is equipped with a line for transmitting reference signals from the down-hole sensors to the surface station.

Difficulties of interpretation also occur due to the fact that the vibrations are not emitted solely at the drilling tool. It has been found that the drill string itself acts as a source of secondary vibration. This is also the case in a surface drilling platform that transmits mechanical energy to the rock through its feet, the transmitted energy being propagated along the drill string and acting as another source of secondary vibration.

It is known and easily verified that the guided waves propagated by a drill string are less quickly attenuated, as a function of the distance from the source, than the volume waves propagated in the formation. Since the guided waves radiate in the formation and create parasitic secondary vibrations, it is justifiable to install appropriate drilling assembly elements to attenuate these effects.

The above-mentioned French Patent 2,700,018 shows that absorbing elements, and possibly resonating elements or acoustic discontinuity elements favoring resonance in the seismic frequently range, can be interposed in the drill string to damp the vibrations propagating directing to the surface along the drill string.

The use of down-hole sensors, possibly associated with in situ data storage devices, is not always possible or advisable for the following reasons:

the down-hole measuring equipment is not designed to operate at the high temperatures prevailing at the bottom of the borehole in geothermal applications or at great depths, and the depth at which the down-hole equipment must operate renders inoperable the wave transmission devices designed to transmit the measurement signals to the surface recording and control station.

Other than the above-noted drawbacks, use of a sensor at the top of the drill string often proves impossible in directional wells because of the multiple reflections that occur along the part of the drill string below the bend, which often distort still further the reference signals used to correlate the recordings.

SUMMARY OF THE INVENTION

The method for seismic prospecting of a geological formation traversed by a well according to the invention involves application of vibrations to the formation by means of a seismic vibration source comprising, in operation, a down-hole assembly comprising a drilling tool advancing at the bottom of a well and connected to the surface drilling equipment by a drill string comprising a drill collar assembly and a set of pipes, the vibration source including a decoupling device disposed in the vicinity of the drilling tool that allow the latter to remain substantially in contact with the well bottom, the method comprising detection of reference signals indicating vibrations of the drill string, reception of waves coming from the formation in response to the vibrations communicated to the rock by a set of seismic receivers coupled with the formation traversed by the well, recording of the waves received at the seismic receivers by a system for acquisition and collection of the seismic signals detected by the seismic receivers, and correlation of the seismic signals thus recorded with the reference signals.

The method of the invention is particularly useful in the case where the vibration source at the bottom of the well is a drilling tool associated with a drilling assembly progressing to the bottom of a well, at the end of a drill string.

The method involves the correlation of reference signals filtered by the decoupling device, furnished by the sensors disposed in contact with the set of pipes beneath the surface of the geological formation and above the decoupling device.

When the well has a bend, reference signals coming from sensors disposed between the bend and the damping device are preferably used for correlation.

In the case where the drilling power comprises a down-hole motor with built-in damping device for driving the drilling tool, the correlation uses reference signals coming from the sensors disposed in contact with the string, receiving the vibrations filtered by these damping device.

According to one embodiment, an additional decoupling device interposed into the string are used to reduce parasitic emissions in the formation, and a filter is used that includes at least one portion of the string whose diameter is intermediate between the diameter of the drill collars and that of the set of pipes, the length of this string portion being chosen as a function of the wavelengths in a seismic frequency range, to attenuate in this range the multiple reflections due to diameter discontinuities intermediate between the drill collars and the pipes in the set of pipes, the sensors being disposed beneath the additional decoupling device.

The device for seismic prospecting of a geological formation according to the invention includes a seismic vibration source comprising a drilling tool advancing at the bottom of a well and connected to surface drilling equipment by a drill string comprising a drill collar assembly and a set of pipes, a drive device for driving the drilling tool, a set of seismic receivers coupled with the formation traversed by the well to receive waves coming from the formation, and a system for acquisition and collection of the seismic signals detected by the seismic receivers (surface station).

The device includes a decoupling device disposed in the vicinity of the drilling tool that allow the latter to remain substantially in contact with the well bottom and a sensor for picking up vibrations from the drill string, disposed in contact with the set of pipes below the surface of the geological formation and above the decoupling devices.

According to one embodiment, the tool drive includes a down-hole motor provided with damping device, the decoupling device being comprised of the damping device.

According to another embodiment, the device has for example has an additional decoupling device interposed into the string to reduce parasitic emissions in the formation that are induced by the vibrations of the drill string, a filter including at least one interposed drill string portion whose diameter is intermediate between the diameter of the drill collars and that of the set of pipes, the length of the drill string portion being chosen as a function of wavelengths in a seismic frequency range, to attenuate in this range the multiple reflections due to diameter discontinuities intermediate between the drill collars and the pipes in the set of pipes, the sensor being located between the decoupling device and the additional decoupling device.

The invention may advantageously have several portions of drill string with decreasing diameters connected with each other, interposed between the drill collars and the set of pipes to minimize the multiple reflections due to intermediate discontinuities between the drill collars and the pipes in the set of pipes.

The sensors means can be disposed in an annular connector interposed in the set of pipes, the connector being connected to the surface station either by cables integrated into a set of wired pipes, or by a combined link including a cylindrical cable connector to connect the sensors means to a portion of cable running inside the pipes that is itself connected to a set of wired pipes going up to the surface station.

The interposed damping and filtering means are preferably chosen to achieve a cumulative damping coefficient of the vibrations between the tool and the accelerometers which is preferably between 5 and 15.

Experience has shown that it is not absolutely necessary to locate the sensors in the immediate vicinity of the down-hole tool to obtain faithful reference signals truly representative of the seismic signals that are actually transmitted to the formation. It has been verified that, with sensors placed relatively high on the drill string, representative signals are obtained provided the decoupling and/or filtering means defined above are used, although they partially attenuate the signals.

This arrangement is advantageous in numerous cases.

By shortening the distance between the sensors and the surface acquisition and recording station, signal transmission is simplified and facilitated.

In all applications where the well bottom temperature is very high: great depth, geothermal operation, etc., it is easier to shield the sensors and possibly the in situ data storage device;

It is always possible, when nonphysical wave transmission device are being used for transmitting the reference signals to the surface, to locate them with the sensors fairly high up on the drill string and thus beyond the maximum wave propagation distance in the formation.

BRIEF DESCRIPTION OF THE DRAWINGS

Other characteristics and advantages of the method and device according to the invention will emerge from reading the description hereinbelow of embodiments described as nonlimiting examples, with reference to the attached drawings wherein:

FIG. 1 shows schematically one embodiment of the seismic prospecting device according to the invention;

FIG. 2 shows schematically the arrangement of the surface control and recording station;

FIG. 3 shows a first embodiment of the device according to the invention using reference sensors remote from the drilling tool;

FIG. 4 shows a second embodiment of the device according to the invention;

FIG. 5 shows a first means of connecting the vibration detection assembly to the surface station;

FIG. 6 shows a second means of connecting the vibration detection assembly to the surface station;

FIGS. 7 to 9 show recordings that display the effects obtained by the new arrangement of the device.

DESCRIPTION OF THE PREFERRED EMBODIMENTS

Figure 9:
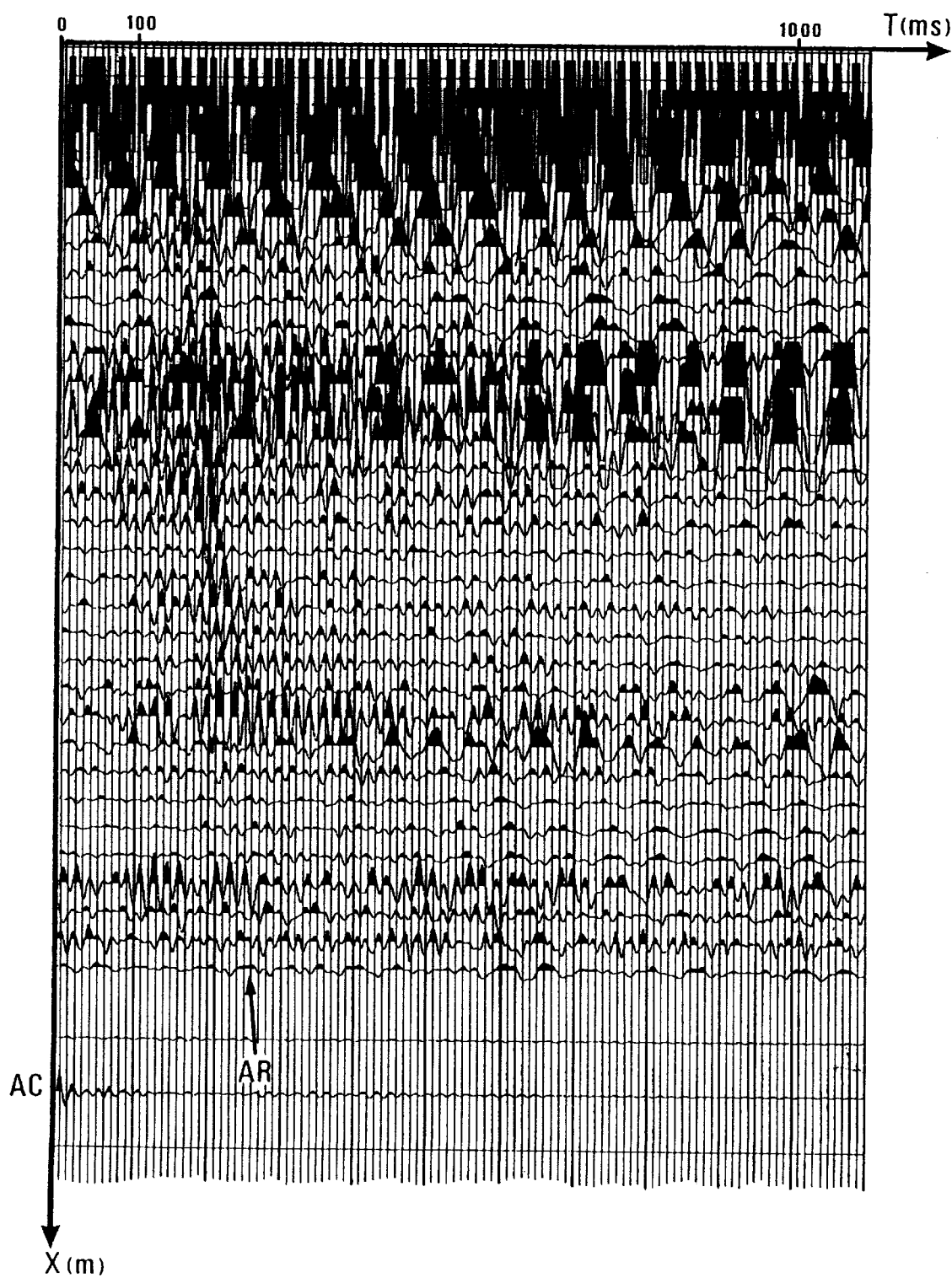

The conventional drilling equipment shown schematically in FIG. 1 has a drilling tool 1 operating at the bottom of a well 2. It is screwed to the end of a drill string or drilling assembly 3 composed of several drill collars 4 and a set of drill pipes 5, the drill string being connected at the surface to means 6 for manipulation or rotation.

The device has one or more accelerometers constituting an assembly 7 for measuring the vibrations created by the drilling tool as it advances. In the case where wired pipes are used or if there are down-hole data storage or transmission assembly with a sufficiently high transmission rate, this assembly 7 is installed in an intermediate connector in the vicinity of the tool, as described in the aforementioned French Patent 2,700,018

The signals from measuring assembly 7 are transmitted via a rotating connector 9 and a cable 10 to a collecting and recording station 11. The seismic signals coming from the formation in response to the vibrations created by drilling tool 1 are received by an assembly 12 that detects the seismic signals propagated in the formation traversed by the well due to vibrations communicated to the rock by drilling tool 1. This receiver assembly 12 has, in known fashion, for example a large number of geophones R1, R2, . . . Rn connected to station 10 by transmission cables 13 (or possibly by radio links). These geophones can be distributed at the surface in a one- or two-dimensional configuration allowing so-called 3D seismic prospecting operations to be conducted.

The receiving assembly can also have sensors installed in one or more other wells. For example, the upper part, already cased, of a well in progress can be used for installing the sensors, according to the method described in the Assignee's French Patent 2,593,292, where sensors are embedded in the cement injected behind a casing tube and thus coupled to the formations traversed.

Surface station 11 has (FIG. 2) a control computer 14 controlling a signal acquisition assembly 15 that acquires the signals transmitted in real time from measuring assembly 7 via cable 10, and acquires the seismic signals picked up by receivers R of receiving assembly 12 and transmitted by transmission cables 13; an assembly 16 for recording the acquired signals; and a display unit 17. The station 11 also has an electrical generator 18 connected to cable 9 for supplying measuring assembly 7 in particular.

Surface station 11 coordinates and synchronizes direct acquisition of both the reference signals generated by reference sensors 7 that faithfully represent the vibrations communicated to the rock by the drilling tool, as well as the signals received by receiving assembly 12. By correlating the received signals with the reference signals, seismic recordings are made of the rock traversed by the well. This correlation can be effected in situ by surface station 11.

If receiving system 12 has triaxial sensors R capable of measuring the components of the seismic signals in three orthogonal axes, surface station 11 can correlate the components of the seismic signals received along the three axes and those on the acceleration vector, components being reconstituted from the signals furnished by the down-hole accelerometers and magnetometers.

Preferably, correlations are made over a sufficient time interval, extending on either side of the self-correlation peak of the signals furnished by the down-hole sensors, to take into account the multiple precursors, if any, with a view to later processing of the recorded seismic data.

A number of experiments have been conducted using a seismic emission-receiving system as described in the aforementioned patents of the Assignee to determine the representativeness of the seismograms obtained in seismic prospecting operations for various configurations of the drill string and various positions of measuring assembly 7 along the string.

Comparisons have been made between the most favorable case in which this measuring assembly 7 is placed in the vicinity of the tool as shown schematically in FIG. 1 and reproduces the vibrations it creates as faithfully as possible, and with the most unfavorable cases where this assembly is located at the top of the set of pipes as practiced formerly.

It has proved possible to verify that the signals delivered by the accelerometers of measuring assembly 7 also constitute valuable reference signals for correlating the seismic signals received, if:

a) this assembly is located in set of pipes 5 at a distance from drilling tool 1, provided it is below the surface of the ground and in all cases in any event under the drive table of the drill string (not shown) in order to remain practically insensitive to noise and resonance produced by the drilling machinery, which alters the signals picked up at the top of the drill string; and mechanical decoupling devices 8 of a known type are interposed above measuring assembly 7. These may be dampers designed to absorb shocks and vibrations of all kinds, whether longitudinal, transverse, or torsional. The resultant decoupling must be sufficient for drilling tool 1 to remain permanently in contact with the well bottom and not to rebound, and also to attenuate radically the vibrations imparted to the upper part of the drill string. Under these conditions, the accelerometers deliver signals representative of the vibrations caused by the tool that will propagate in the formation.

In a down-hole motor is used to drive the drilling tool, the elastic coupling elements built into this type of motor can provide the required mechanical decoupling.

To attenuate sufficiently the waves propagating along the drill string, the mechanical decoupling devices can also have a damper 19 interposed between measuring assembly 7 and the surface, in order to:

a) better avoid parasitic seismic transmission along the well that could distort the recordings; and b) better attenuate, in the useful frequency band for seismic prospecting, the multiple reflections due to discontinuities in cross section in the positions of the column that are intermediate between the drilling tool and the measuring assembly 7, particularly the multiple large reflections occurring at the connection between drill collars 4 and set of pipes 5, whose diameters are very different.

To obtain these attenuation effects, the embodiment shown schematically in FIG. 3 can be used, for example. A considerable attenuation of multiple reflections is obtained here by interposed between the drill collars and the first of pipes 5, at least one connector with an intermediate diameter 20 whose length is chosen according to the wavelengths in a seismic frequency range. The length of this portion of the drill string is also chosen for example to be one-quarter the average wavelength in the seismic range.

For a central frequency Fm=30 Hz for example, in view of the wave propagation rate in the drill pipes (on the order of 5000 m/s), a quarter-wavelength represents about 42 m, or approximately 4 to 5 heavy pipes with a unit length of 9 meters.

Damping devices 8 are located in the vicinity of tool 1, in drill collars 4. The additional damping device 19 placed further from the tool are interposed into the portion 20 of drill string. Examples of the effect brought about by inserting these damping and filtering means are shown in FIGS. 7 to 9 where AC designates the auto-correlation of the reference signal and AR, the direct seismic arrival after propagation of the drilling tool at the surface.

FIG. 7 shows one example of a recording correlated with a reference signal sensor(s) placed between the tool and the damping device 8 (previous embodiment).

FIG. 8 shows a correlated recording, with drill string 3 having no decoupling device. The individual skilled in the art can easily see that the direct seismic arrival, clearly visible in FIG. 7, is totally scattered over time in FIG. 8, which brings about serious difficulties in later processing.

FIG. 9 shows one example of a recording correlated with a reference signal coming from sensors 7 located above damping device 8 but below the rotating head of the drill string, the recording being obtained during drilling of the same formation that produced the recordings in FIGS. 7 and 8. The individual skilled in the art can also easily see that the direct seismic arrival is still clearly visible with a location in time of comparable quality to that of FIG. 7 which, it will be recalled, was obtained when accelerometers 7 were located in the immediate vicinity of the drilling tool and above damping device 8.

Although it benefits from the advantages afforded by a higher location of sensor means in the drill string at a point that does not interfere with drilling operations, nonetheless, seismic recordings of excellent quality by comparison to those obtained with down-hole sensors are obtained with the proposed arrangement after processing.

Good results are obtained by choosing damping devices 8 and 19 that provide a cumulative damping coefficient of the vibrations between the tool and the top of the drill string, preferably between 5 and 15.

Preferably, a set 21 of connectors with decreasing cross sections whose sizes are intermediate between the sections of drill collars 4 and the pipes in set of pipes 5, is interposed (FIG. 4), the pipes being known as HWDP (heavy weight drill pipes), so as to form a "taperized" drill string.

The accelerometers of assembly 7 are connected to surface station 11 either by cables lowered inside the pipes or by cables running along the wired pipes.

According to the embodiment of FIG. 5, measuring assembly 7 can be disposed in an annular connector interposed in the set of pipes, as described more fully in French Patent 2,688,026. It can be connected to the surface by cables integrated into a set of wired pipes 22. This type of annular unit is "transparent" to the driller, who can lower tools through it to the bottom of the drill string if necessary.

According to the embodiment of FIG. 6, the same annular unit 7 can be connected to the surface by a combined link. A cylindrical cable connector connects it to a portion of cable 24 running inside the pipes, the portion being connected to a set 25 of wired pipes extending to the surface. With this configuration, the driller who wishes to lower tools to the bottom of the drill string must first remove the fixed cable portion.

What is claimed is:

1. A method for seismic prospecting while drilling a well through a formation to be investigated by using elastic waves generated by a bottom hole assembly including a drill bit associated with drill collars advancing at a bottom of the well and connected to surface drilling equipment by a drill string, the method comprising:

receiving vibrations coming from the formation in response to the elastic waves provided by the bottom hole assembly by a set of seismic receivers coupled with the formation;

recording signals generated by the seismic receivers when receiving the elastic waves and correlating the recorded signals with reference signals representing the imparted elastic waves;

using as the reference signals signals sensed by a reference sensor positioned on and coupled with the drill string below a surface of the formation; and attenuating vibrations propagating towards the drill string with a dampening assembly including a first dampening device positioned in the bottom hole assembly below the reference sensor to maintain the drilling tool substantially in contact with the bottom of the well, with a second dampening device interposed into the drill string to reduce the parasitic emissions in the formation, and with a filter including at least one pipe portion with a diameter intermediate between a diameter of the drill collars and a diameter of the drill string, the length of the pipe portion being chosen as a function of wavelengths in a seismic frequency range, to attenuate in the seismic frequency range multiple reflections due to discontinuities in diameter of the pipe portion intermediate between the drill collars and the drill string and the reference sensor is disposed beneath the second dampening device.

2. A method in accordance with claim 1 wherein:
the well includes a bend; and the reference signals are sensed by the reference sensor which is disposed between the bend and the dampening device.

3. A method in accordance with claim 1 wherein:
a down-hole motor includes the first dampening device and drives the drill bit.

4. A device for seismic prospecting of a geological formation comprising a seismic vibration source comprising a drilling tool advancing at a bottom of a well and connected to surface drilling equipment by a drill string including a drill collar assembly and a drill string, a drive for driving the drilling tool, a set of seismic receivers, coupled with the formation traversed by the well, for receiving waves coming from the formation, and a system for acquisition and collection of the seismic signals detected by the seismic receivers, including a dampening assembly disposed in a vicinity of the drilling tool and including a first dampening device positioned in the bottom hole assembly below a reference sensor to maintain the drilling tool substantially in contact with the bottom of the well, a second dampening device interposed into the drill string to reduce parasitic emissions in the formation, and a filter including at least one pipe portion with a diameter intermediate between a diameter of the drill collars and a diameter of the drill string, the length of the pipe portion being chosen as a function of wavelengths in a seismic frequency range, to attenuate in the seismic frequency range multiple reflections due to discontinuities in diameter of the pipe portion intermediate between the drill collars and the drill string and the reference sensor is disposed beneath the second dampening device.

5. A device according to claim 4, wherein the drive includes a down-hole motor provided with the first dampening device.

6. A device according to claim 4, wherein the filter includes a plurality of portions of pipes of decreasing diameters, connected with each other interposed between the drill collar assembly and the drill string to minimize the multiple reflections caused by intermediate discontinuities between the drill collar assembly and the drill string.

7. A device according to claim 4, wherein the reference sensor is disposed in an annular connector interposed on the at least one pipe portion, the annular connector being connected to the system for acquisition and collection by cables integrated into a set of wired pipes.

8. A device according to claim 4, wherein the reference sensor is connected to an acquisition and collection system by a combined link including a cylindrical cable connector for connecting the reference sensor to the at least one portion of cable running inside the drill string, the at least one portion being connected to a set of wired pipes extending to the acquisition and collecting system.

9. A device according to claim 4, wherein the dampening assembly is chosen to achieve a cumulative damping coefficient of the vibrations between the drilling tool and the reference sensor which is between 5 and 15.

* * * * *